United States Patent
Yang et al.

(10) Patent No.: US 9,428,034 B2
(45) Date of Patent: Aug. 30, 2016

(54) INTEGRATED VEHICLE CABIN WITH DRIVER OR PASSENGERS' PRIOR CONDITIONS AND ACTIVITIES

(71) Applicant: Ford Global Technologies, LLC, Dearborn, MI (US)

(72) Inventors: Hsin-hsiang Yang, Ann Arbor, MI (US); Kwaku O. Prakah-Asante, Commerce Township, MI (US); Gary Steven Strumolo, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 116 days.

(21) Appl. No.: 14/337,097

(22) Filed: Jul. 21, 2014

(65) Prior Publication Data

US 2016/0016454 A1   Jan. 21, 2016

(51) Int. Cl.
*B60H 1/00* (2006.01)
*B60R 16/037* (2006.01)

(52) U.S. Cl.
CPC ........ *B60H 1/00742* (2013.01); *B60R 16/037* (2013.01)

(58) Field of Classification Search
CPC .............. A61B 2560/0242; A61B 2560/0205; A61B 5/02; A61B 5/0205; A61B 5/02055; A61B 5/024; A61B 5/02438; A61B 5/1118; B60H 1/00742; B60H 1/00642; B60H 1/00657; B60H 1/00735; B60H 1/00971; G08B 21/06; G06F 17/00
See application file for complete search history.

(56) References Cited

U.S. PATENT DOCUMENTS

| | | | |
|---|---|---|---|
| 5,988,517 A | * | 11/1999 | Bauer ............... B60H 1/00864 165/217 |
| 6,265,978 B1 | | 7/2001 | Atlas |
| 7,020,508 B2 | | 3/2006 | Stivoric et al. |
| 7,224,282 B2 | | 5/2007 | Terauchi et al. |
| 7,813,840 B2 | | 10/2010 | Suyama et al. |
| 8,152,694 B2 | | 4/2012 | Srinivasan et al. |
| 8,280,584 B2 | | 10/2012 | Mikat |
| 2009/0259138 A1 | | 10/2009 | Lin et al. |
| 2013/0144470 A1 | | 6/2013 | Ricci |

FOREIGN PATENT DOCUMENTS

| | | |
|---|---|---|
| JP | 2006102362 A | 4/2006 |
| WO | WO 2013072926 A2 | 5/2013 |

OTHER PUBLICATIONS

Driver Vehicle Environment Monitoring Modules, Katia Pagle, ICCS, Apr. 15-16, 2008.

* cited by examiner

*Primary Examiner* — Thomas Tarcza
*Assistant Examiner* — Edward J Pipala
(74) *Attorney, Agent, or Firm* — James P. Muraff; Neal, Gerber & Eisenberg LLP (57) ABSTRACT

Described herein is a system, apparatus, and method for providing an integrated vehicle cabin experience. A wearable device including one or more bio-physical sensors may be configured to sense bio-physical conditions from a wearer of the wearable device and determine a state of the wearer. The state information may then be referenced by a vehicle computing system in order to control one or more vehicle systems and/or components that create a cabin environment.

16 Claims, 5 Drawing Sheets

300

| | Entry Conditions | | | | | Adjustment | |
|---|---|---|---|---|---|---|---|---|
| | Wearable Device Sensors | | | | Vehicle Sensors | | Cabin Systems | |
| | Activity Level | Heart Rate | Body Temp. | Perspiration | Ambient Temp. | Cabin Temp. | AC / Heater | Vent |
| (1) sweating | high | high | high | high | low | low | defrost | on |
| (2) cold feet | mid | mid | low | - | low | low | floor | off |
| (3) sleepy | low | low | low | - | - | - | high | on |

| | Entry Conditions | | | | | | Adjustment | |
|---|---|---|---|---|---|---|---|---|
| | Wearable Device Sensors | | | | Vehicle Sensors | | Cabin Systems | |
| | Activity Level | Heart Rate | Body Temp. | Perspiration | Ambient Temp. | Cabin Temp. | AC / Heater | Vent |
| (1) sweating | high | high | high | high | low | low | defrost | on |
| (2) cold feet | mid | mid | low | - | low | low | floor | off |
| (3) sleepy | low | low | low | - | - | - | high | on |

FIGURE 5

INTEGRATED VEHICLE CABIN WITH DRIVER OR PASSENGERS' PRIOR CONDITIONS AND ACTIVITIES

TECHNICAL FIELD

This disclosure generally relates to a system, apparatus, and method for providing an integrated vehicle cabin experience. A wearable device including one or more bio-physical sensors may be configured to sense bio-physical conditions from a wearer of the wearable device and determine a state of the wearer. The state information may then be referenced by a vehicle computing system in order to control one or more vehicle systems and/or components that create a cabin environment.

BACKGROUND

A vehicle may include various systems and components that are responsible for creating a desirable cabin environment inside of a vehicle. The vehicle may also include various systems and components that are configured to provide useful information for the passengers that travel within the vehicle cabin.

A passenger may control the various systems and components in order to create a more comfortable, and informative, cabin environment once the passenger enters the cabin. However, manually inputting controls may be inefficient and less convenient for the passenger.

SUMMARY

Exemplary embodiments provide a wearable device and a personalized cabin control tool for controlling conditions within a vehicle cabin to provide a more enjoyable travel experience for a passenger of the vehicle. In order to achieve these objectives, the wearable device may be configured to gather a passenger's bio-physical information prior to the passenger entering the vehicle cabin in order to determine the passenger's physical, mental, and/or emotional state. The cabin control tool may then be configured to analyze the passenger's bio-physical information in order to control one or more vehicle systems and/or components based on the passenger's state and/or gathered bio-physical information. In some embodiments, the vehicle may additionally include bio-physical sensors for obtaining bio-physical condition information on the passenger while the passenger is within the vehicle cabin. In such embodiments, the bio-physical condition information obtained by the vehicle sensors may also be referenced when controlling the one or more vehicle systems and/or components.

Further, a portion of the cabin control tool may be running on the wearable device, and another portion of the cabin control tool may be running on a computing system on the vehicle in order to ensure proper communication between the wearable device and the vehicle. A more detailed description of the cabin control tool is provided throughout this disclosure.

It follows that a vehicle computing system for controlling a vehicle cabin environment is provided. The vehicle computing system may comprise an interface configured to receive user state information; a memory configured to store cabin adjustment commands corresponding to a user state; and a processor in communication with the interface and the memory. The processor may be configured to: receive the user state information; identify the user state based on the user state information; and implement the cabin adjustment commands corresponding to the user state.

It also follows that a method for controlling a vehicle cabin environment is provided. The method may comprise receiving, by a processor, user state information received from a wearable device; storing, on a memory, cabin adjustment commands corresponding to a user state; identifying, by the processor, the user state based on the user state information; and controlling, by the processor, the implementation of the cabin adjustment commands corresponding to the user state.

It also follows that a vehicle cabin control system comprising a wearable device and a vehicle computing system is provided. The wearable device may comprise a wearable sensor configured to obtain sensor information from a user; a memory configured to store entry conditions identifying a user state; and a processor, wherein the processor may be configured to: determine the entry conditions identifying the user state are satisfied based on a comparison of the sensor information and the entry conditions. The vehicle computing system may be configured to receive the user state information from the wearable device.

This application is defined by the appended claims. The description summarizes aspects of the embodiments and should not be used to limit the claims. Other implementations are contemplated in accordance with the techniques described herein, as will be apparent upon examination of the following drawings and detailed description, and such implementations are intended to be within the scope of this application.

BRIEF DESCRIPTION OF THE DRAWINGS

For a better understanding of the invention, reference may be made to embodiments shown in the following drawings. The components in the drawings are not necessarily to scale and related elements may be omitted so as to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated. Not all of the depicted components described in this disclosure may be required, however, and some implementations may include additional, different, or fewer components from those expressly described in this disclosure. Variations in the arrangement and type of the components may be made without departing from the spirit or scope of the claims as set forth herein.

A vehicle may be designed to provide a safe, comfortable, and convenient experience to a passenger (e.g., driver, or other non-driver passenger) of the vehicle. One way a passenger's vehicle cabin experience may be enhanced is to integrate the passenger's prior out of cabin experiences to influence the operation of one or more vehicle systems and/or components that may contribute to the environmental conditions within the vehicle cabin.

It follows that a wearable device configured to sense one or more bio-physical conditions of a passenger prior to the passenger entering the vehicle cabin is disclosed. The wearable device may be configured to analyze the sensed bio-physical information from the passenger in order to determine a physical, mental, and/or emotional state of the passenger. The passenger's state information may then be provided to a vehicle computing system that is configured to control one or more vehicle systems and/or components for creating the vehicle cabin environment based on the received passenger state information.

In some embodiments, the wearable device may further be configured to sense the passenger's bio-physical conditions while inside the vehicle cabin in order to allow the vehicle computing system to provide on-going vehicle cabin adjustments based on the passenger's determined state information.

In some embodiments, the vehicle may additionally include bio-physical sensors for obtaining bio-physical condition information on the passenger while the passenger is within the vehicle cabin. In such embodiments, the bio-physical condition information obtained by the vehicle sensors may also be referenced when controlling the one or more vehicle systems and/or components.

In order to achieve the integrated vehicle cabin experience based on the passenger's bio-physical condition information, a cabin control tool is disclosed. The cabin control tool may be a program, application, and/or some combination of software and hardware that is incorporated on one or more of the components that comprise the wearable device and the vehicle's operating system that runs on a vehicle computing system. In order to achieve effective communication between the wearable device and the vehicle operating system, the cabin control tool may be understood to be running on both the wearable device and the vehicle computing system. Further description for the cabin control tool and the components of the vehicle's computing system running the cabin control tool is described in more detail below.

Figure 1:
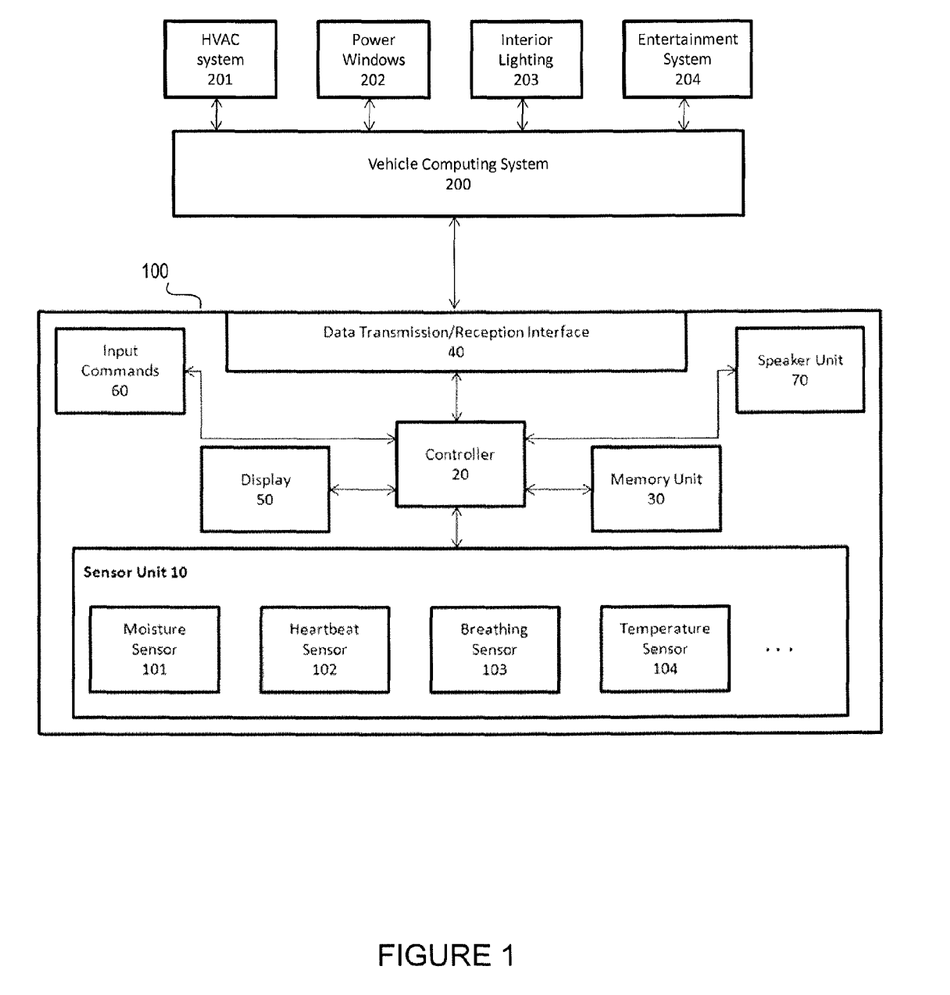
FIG. 1 illustrates an exemplary block diagram for a system including a wearable device and a vehicle computing system according to some embodiments.

FIG. 1 illustrates an exemplary wearable device 100 in communication with an exemplary vehicle computing system 200, wherein the wearable device 100 and the vehicle computing system 200 may be utilized to implement the features described throughout this disclosure. The wearable device 100 may, for example, be worn by a user (e.g., passenger) for a period of time prior to the user entering a vehicle cabin. For instance, the passenger may wear the wearable device while engaging in a low-level activity (e.g., going for a walk), engaging in a mid-level activity (e.g., taking a bike ride), high-level activity (e.g., playing in a basketball game), or resting activity (e.g., sleeping).

The wearable device 100 may include a sensor unit 10 that includes a plurality of bio-physical condition sensing sensors for sensing one or more bio-physical conditions from a passenger that is wearing the wearable device 100. The wearable device 100 may include, for example, a moisture sensor 101. The moisture sensor 101 may be in contact, or at least close proximity, to the user in order to allow the moisture sensor 101 to sense moisture on the surface of the user's skin.

The sensor unit 10 may also include a heartbeat sensor 102. The heartbeat sensor 102 may be an electrical signal type that is in contact with the user's skin in order to pick up electrical signals corresponding to the user's heartbeat. The heartbeat sensor 102 may alternatively be an acoustic type that is in close proximity, or actual contact, with the user's skin in order to pick up acoustic signals corresponding to the user's heartbeat. The heartbeat sensor 102 may alternatively be a haptic type that is in contact with the user's skin in order to pick up vibrational signals corresponding to the user's heartbeat.

The sensor unit 10 may also include a breathing sensor 103. The breathing sensor 103 may be an acoustic type that is in close proximity, or actual contact, with the user's skin in order to pick up acoustic signals corresponding to the user's breathing patterns. The breathing sensor 103 may alternatively be a haptic type that is in contact with the user's skin in order to pick up vibrational signals corresponding to the user's breathing pattern.

The sensor unit 10 may also include a temperature sensor 104 as part of its sensor unit 10. The temperature sensor 104 may be a mechanical type or electrical type of temperature sensor that is in close proximity, or in actual contact, with the user's skin.

The list of bio-physical condition sensors that may be included as part of the sensor unit 10 is provided for exemplary purposes only, as more or fewer sensors may be included on the overall wearable device 100. For example, the sensor unit 10 may additionally include a general activity sensor (not illustrated) that may sense an activity level for the passenger.

Also, although each sensor is illustrated as its own unique block, according to some embodiments a same physical sensor may be utilized by the wearable device 100 for sensing one or more bio-physical conditions. In addition or alternatively, one or more sensors within the sensor unit 10 may share physical components.

The wearable device 100 may also include a memory unit 30 configured to store, among other information, information related to the sensed bio-physical conditions. The memory unit 30 may also store a lookup table (e.g., table 300 illustrated in FIG. 3) or database that identifies a specific set of sensed bio-physical conditions that allow the cabin control tool to predict the passenger's state (i.e., the wearer of the wearable device 100 may be understood to be a passenger of a vehicle during a time period before entering the vehicle cabin, and in some embodiments during a time period while inside the vehicle cabin). Further description of such a lookup table and/or database is provided in more detail throughout this disclosure. The memory unit may, for example, be a solid-state or disk based memory capable of storing digital information.

The wearable device 100 may also include a data transmission/reception interface 40 configured to transmit, among other information, information related to the sensed bio-physical conditions. The data transmission/reception interface 40 may also be configured to receive information from a computing device (e.g., vehicle computing system 200) that is in communication with the wearable device via the data transmission/reception interface 40. The data transmission/reception interface 40 may be capable of communicating information to and from another computing device according to known communication protocols such as Bluetooth, NFC, WiFi, or telecommunication network protocols.

Although not specifically illustrated, for embodiments where the wearable device 100 is not able to communicate directly with the vehicle computing system 200, an intermediary device may be utilized to allow for effective communication. For example, a communication application running on a smartphone may act as the intermediary device so that the wearable device 100 communicates information to the smartphone, and the smartphone then is configured by the application to allow for the information from the wearable device 100 to then be communicated to the vehicle computing system 200. Other types of intermediary devices are also contemplated.

The wearable device 100 may also include a display 50 configured to display, among other information, information related to the sensed bio-physical conditions.

The wearable device 100 may also include an input commands unit 60 that is configured to receive command inputs from a wearer of the wearable device 100. The input commands unit 60 may include one or more of a control knob, keypad, digital camera for image/video capture and/or visual command recognition, touch screen, audio input device, buttons, or touchpad.

The wearable device 100 may also include a speaker unit 70, configured to output among other messages, messages related to the sensed bio-physical conditions.

The wearable device 100 may also include a controller 20, configured to control one or more of the components included in the wearable device 100. For example, in the wearable device 100 illustrated in FIG. 1, the controller 20 may control, send information to, or receive information from the sensor unit 10, memory unit 30, display 50, input commands unit 60, speaker unit 70, or the data transmission/reception interface 40. The controller 20 may also be configured to run the cabin control tool on the wearable device 100.

Although not specifically reflected in FIG. 1, the wearable device 100 may take the form of a bracelet worn around the passenger's wrist or ankle, a necklace worn around the passenger's neck, or a strap-type of wearable device intended to strap around a limp of the passenger. In some embodiments, the wearable device 100 may be a smartphone that is intended to be kept on the passenger's person, either in direct contact with the passenger or in close proximity with the passenger's person in order for one or more of the bio-physical sensors to operate appropriately.

The wearable device 100 illustrated in FIG. 1 is provided for exemplary purposes only, as the wearable device 100 may include fewer, or more, components according to other embodiments.

FIG. 1 also illustrates the vehicle computing system 200. The vehicle computing system 200 is configured to receive information (e.g., the sensed bio-physical condition information and/or passenger state information) from the wearable device 100. The vehicle computing system 200 is also configured to run a portion of the cabin control tool described throughout this disclosure. Then based on the received information from the wearable device 100, the vehicle computing system 200 may control one or more vehicle systems and/or components that create the vehicle cabin environment. For example, FIG. 1 illustrates that the vehicle computing system 200 is in communication, and may thus control, with the following vehicle systems and/or components that contribute to creating the vehicle cabin environment: the vehicle HVAC system 201, power windows 202, interior lighting 203, and entertainment system 204. The list of vehicle systems and/or components the vehicle computing system 200 is provided for exemplary purposes only, as the vehicle computing system 200 may control a lesser or greater number of vehicle systems and/or components that contribute to creating the vehicle cabin environment.

Figure 5:
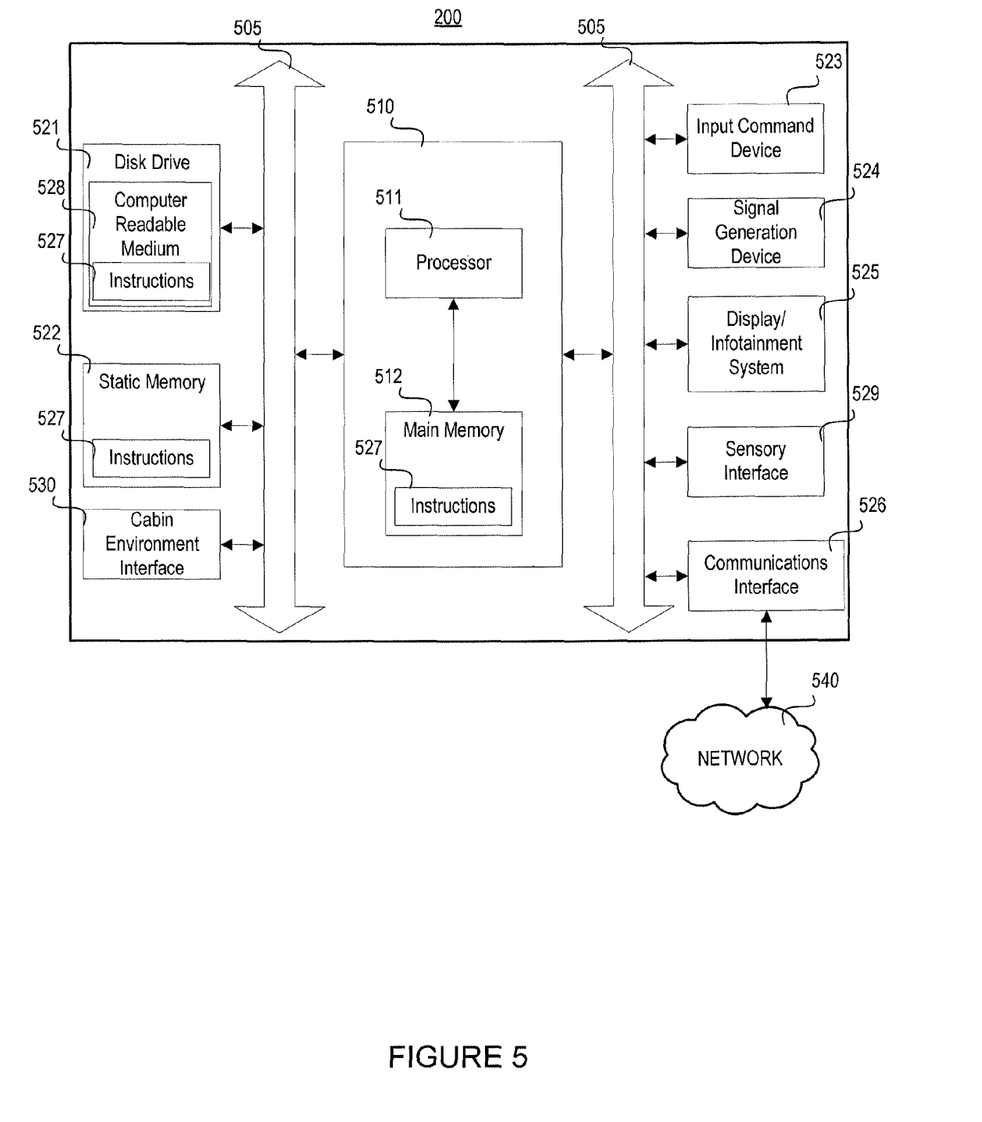
FIG. 5 illustrates an exemplary block diagram for a computing system that may be part of a vehicle system according to some embodiments.

FIG. 5 illustrates a more detailed description for the exemplary vehicle computing system 200 that may be housed within a vehicle. The vehicle computing system 200 may be used to carry out any one or more of the methods, features, and processes discussed herein.

As provided in FIG. 5, the vehicle computing system 200 may include a processing unit 510 comprised of a processor 511 in communication with a main memory 512, wherein the main memory 512 stores a set of instructions 527 that may be executed by the processor 511 to cause the computing system 500 to perform any one or more of the methods, processes or computer-based functions disclosed herein. For example, the cabin control tool described throughout this disclosure may be a program that is comprised of a set of instructions 527 that are executed to perform any one or more of the methods, processes or computer-based functions described herein such as the processes for controlling one or more vehicle systems and/or components that create a vehicle cabin environment based on obtained passenger bio-physical condition information and/or predicted passenger state information. The vehicle computing system 200 may be connected, using a network 540, to other computer systems or peripheral devices such as the wearable device 100 described herein.

Further, while a single vehicle computing system 200 is illustrated, the term "system" shall also be taken to include any collection of systems or sub-systems that individually or jointly execute a set, or multiple sets, of instructions to perform one or more computer functions.

As illustrated in FIG. 5, the vehicle computing system 200 may include the processor 511, such as a central processing unit ("CPU"), a graphics processing unit ("GPU"), or both. Moreover, the vehicle computing system 200 can include the main memory 512 and a static memory 522 that can communicate with each other via a bus 505. As shown, the vehicle computing system 200 may further include a display unit 525, such as a liquid crystal display ("LCD"), an organic light emitting diode ("OLED"), a flat panel display, a solid state display, or a cathode ray tube ("CRT"). The display unit 525 may correspond to a display component of a navigation system, vehicle infotainment system, a heads-up display, or instrument panel of the vehicle 101. Additionally, the vehicle computing system 200 may include one or more input command devices 523, such as a control knob, instrument panel, keyboard, scanner, digital camera for image capture and/or visual command recognition, touch screen or audio input device, buttons, a mouse or touchpad. The computing system 500 can also include a disk drive unit 521 for receiving a computer readable medium 528. In a particular embodiment, the disk drive unit 521 may receive the computer-readable medium 528 in which one or more sets of instructions 527, such as the software corresponding to the cabin control tool, can be embedded. Further, the instructions 527 may embody one or more of the methods or logic as described herein. In a particular embodiment, the instructions 527 may reside completely, or at least partially, within any one or more of the main memory 512, the static memory 522, computer readable medium 528, and/or within the processor 511 during execution of the instructions 527 by the processor 511.

The vehicle computing system 200 may also include a signal generation device 524, such as a speaker or remote control, and a sensory interface 529. The sensory interface 529 may be configured to receive information obtained by one or more sensors that are part of the vehicle system. For example, the vehicle system may include one or more moisture sensors located, for example, on the steering wheel or shift knob assembly for sensing moisture found on the skin of a passenger. The vehicle system may also include a heartbeat sensor located, for example, on a portion of a seatbelt assembly that is intended to cross the body of a passenger seated within the vehicle cabin. The vehicle system may also include a breathing sensor located, for example, within the vehicle cabin. The vehicle system may also include a body temperature sensor located, for example, on the steering wheel, shift knob, seatbelt assembly, or some other in-cabin component that is in contact, or at least in close proximity, to a passenger within the vehicle cabin. The vehicle system may also include one or more ambient temperature sensors for sensing an ambient temperature outside of the vehicle cabin, as well as one or more in-cabin temperature sensors for sensing a temperature within the vehicle cabin. In some embodiments, the sensory interface 529 may also receive information identifying the state of certain vehicle components such as the state of window positions, sunroof positions, throttle positions, and other detectable states for vehicle system components. The cabin control tool may then reference any one or more of the sensor information received through the sensory interface 529.

The vehicle computing system 200 may further include a communications interface 526. The communications interface 526 may be comprised of a network interface (either wired or wireless) for communication with an external network 540. The external network 540 may be a collection of one or more networks, including standards-based networks (e.g., 2G, 3G, 4G, Universal Mobile Telecommunications System (UMTS), GSM® Association, Long Term Evolution (LTE)™, or more), WiMAX, Bluetooth, near field communication (NFC), WiFi (including 802.11 a/b/g/n/ac or others), WiGig, Global Positioning System (GPS) networks, and others available at the time of the filing of this application or that may be developed in the future. Further, the external network 540 may be a public network, such as the Internet, a private network, such as an intranet, or combinations thereof, and may utilize a variety of networking protocols now available or later developed including, but not limited to TCP/IP based networking protocols. The vehicle computing system 200 may communicate with the wearable device 100 illustrated in FIG. 1 through the communications interface 526.

In some embodiments the program that embodies the cabin control tool may be downloaded and stored on any one or more of the main memory 512, computer readable medium 528, or static memory 522 via transmission through the network 540 from an off-site server. Further, in some embodiments the cabin control tool running on the vehicle computing system 200 may communicate with an information server through the communication interface 526 and via the network 540. For example, the cabin control tool may communicate with an information server to receive information on the passenger, receive updates to a table or database for predicting a passenger's state, or requesting additional information that may be referenced by the cabin control tool to accomplish any of the features described herein.

The vehicle computing system 200 also includes a cabin environment interface 530 for communicating with one or more vehicle systems and/or components that create the vehicle cabin environment. For example, command control signals may be transmitted to any one or more of the vehicle HVAC system 201, power windows 202, interior lighting 203, and entertainment system 204 illustrated in FIG. 1, through the cabin environment interface 530.

Figure 2:
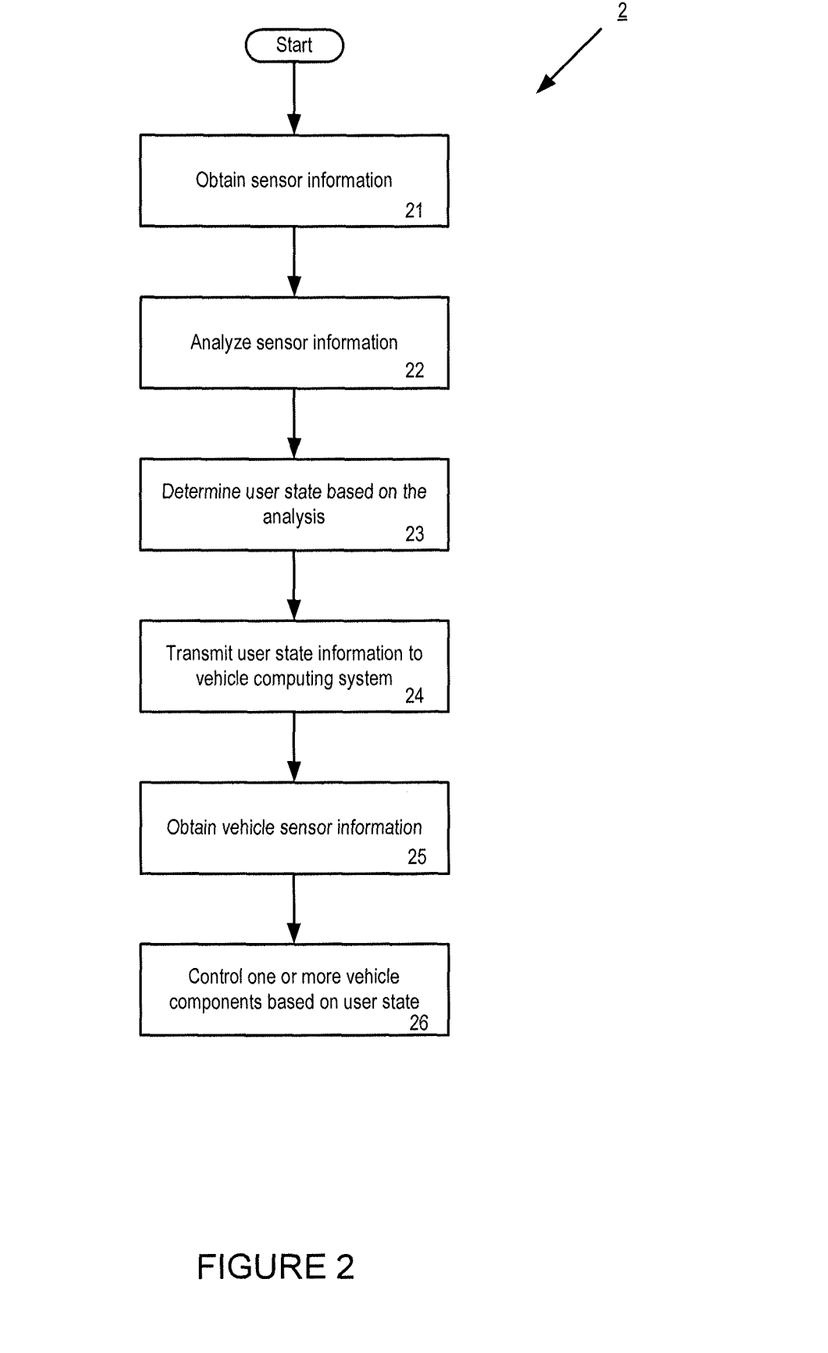
FIG. 2 illustrates an exemplary flow chart describing a process according to some embodiments.

Referring now to FIG. 2, a flowchart 2 is illustrated that describes a process for obtaining bio-physical information from a user wearing a wearable device, analyzing the sensed bio-physical information in order to determine a state of the user, and controlling one or more vehicle systems or components to create or adjust a vehicle cabin environment based on the determined/predicted state of the user. The processes described in flowchart 2 may, for example, be controlled by the cabin control tool described herein. Although reference is made to the user of the wearable device, it should be noted that the user described with reference to FIG. 2 corresponds to a passenger of the vehicle that is wearing the wearable device.

At 21, the cabin control tool running on the wearable device may control one or more bio-physical sensors included on the wearable device to obtain bio-physical condition information from the user. For example, the cabin control tool may sense bio-physical condition information from the one or more bio-physical sensors of the wearable device according to any one or more of the features described throughout this disclosure. The cabin control tool may obtain the condition information on the user for a set amount of time until the cabin control tool recognizes the wearable device is within a set distance from the vehicle, for a set amount of time while outside of the vehicle cabin, for a set amount of time where the start and start times are input by the passenger into the wearable device directly, or some other identifiable amount of time during which the user may be considered to be outside of the vehicle cabin. In other words, the bio-physical condition information obtained at 21 is understood to be sensed from the user while the user is outside of the vehicle cabin.

At 22, the cabin control tool may analyze the bio-physical condition information obtained at 21. The analysis of the bio-physical condition information may, according to preferred embodiments, be accomplished by the portion of the cabin control tool running on the wearable device. In such embodiments, the analysis at 22 may include comparing the sensed bio-physical condition information against a set of bio-physical pre-conditions in order to determine a predicted user state where the sensed bio-physical condition information satisfies a corresponding set of pre-conditions. For example, the wearable device may store a lookup table of pre-conditions that are set up to correspond to a number of preset physical, emotional, or mental states. Such a lookup table is represented by lookup table 300 illustrated in FIG. 3. The pre-conditions may identify a range of bio-physical conditions that would allow the cabin control tool to categorize the user of the wearable device into one or more pre-set physical, emotional, or mental states. It follows that when the bio-physical condition information sensed at 21 is found to satisfy a set of pre-conditions in the lookup table, the cabin control tool may then predict the user's state to be the passenger state found in the lookup table that corresponds to the set of satisfied pre-conditions.

Figure 3:
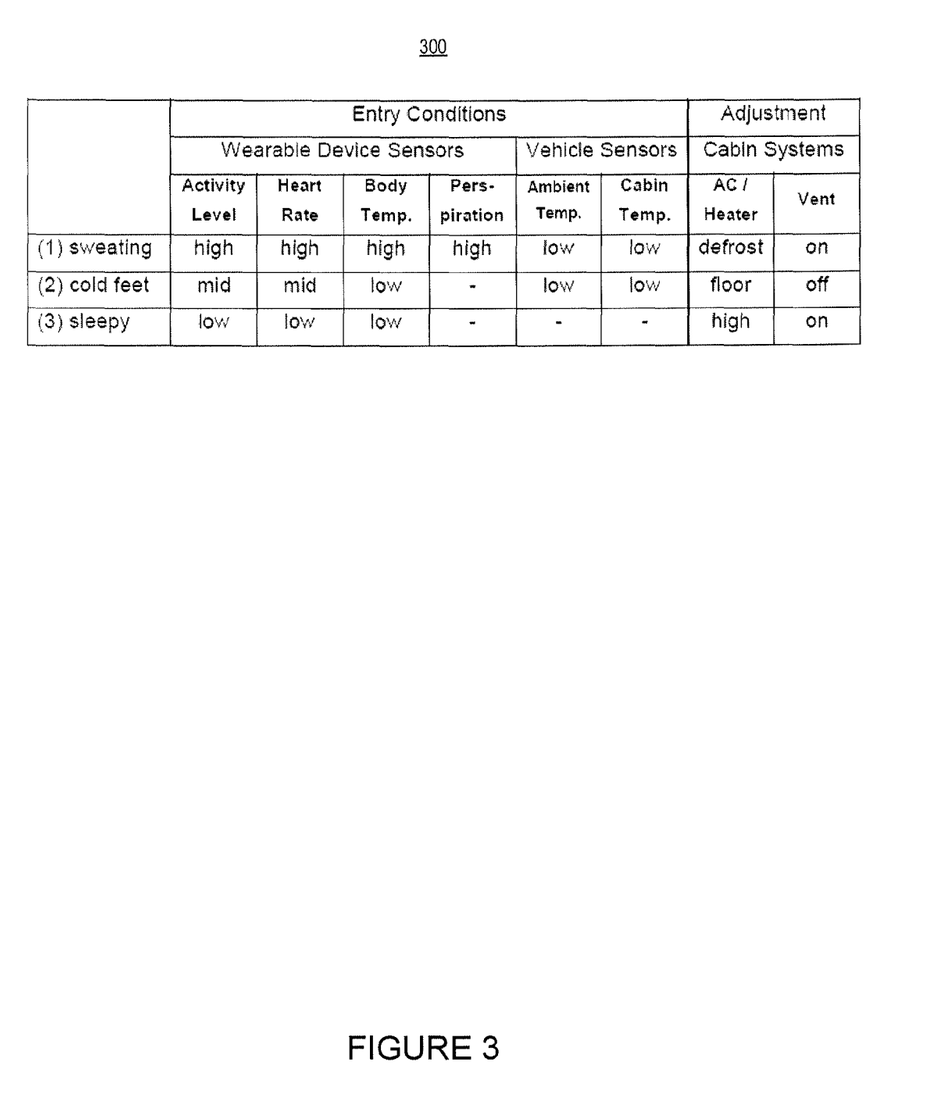
FIG. 3 illustrates an exemplary table including pre-conditions for predicting a passenger's state and the corresponding cabin environment adjustments, according to some embodiments.

The pre-conditions may be categorized to include specific ranges of the sensed bio-physical conditions into specific level categorizations (e.g., low, mid, high) as illustrated in lookup table 300. For example, specific ranges of sensed user moisture values may be categorized as a low moisture/perspiration level, specific ranges of sensed user moisture values may be categorized as a medium moisture/perspiration level, and specific ranges of sensed user moisture values may be categorized as a high moisture/perspiration level. Similar categorization of specific sensed bio-physical condition values into specific levels may be accomplished for one or more of the bio-physical condition information sensed by sensors of the wearable device. It follows then that specific combinations of bio-physical condition levels may then be stored into the lookup table as relating to specific predicted user states.

At 23, the cabin control tool may take the analysis of the bio-physical condition information from 22 and determine a predicted state of the user based on the analysis. For example, continuing the example provided above with reference to lookup table 300 in FIG. 3, when the sensed bio-physical condition information is analyzed and found to include a high activity level (as sensed from an activity sensor), a high heart rate (as sensed from a heartbeat sensor), a high body temperature (as sensed from a temperature sensor, and a high perspiration level (as sensed from a moisture sensor), the cabin control tool may predict that the user is in a sweating physical state at 23.

At 24, the predicted user state information may be transmitted from the wearable device to a vehicle computing system. The transmission of the user state information may be initiated automatically based on the cabin control tool running on the wearable device detecting the wearable device is within a predetermined proximity threshold from the vehicle that includes the vehicle computing system. In such embodiments, the portion of the cabin control tool running on the wearable device may automatically transmit the user state information to the portion of the cabin control tool running on the vehicle computing system. Alternatively, the transmission of the user state information may be initiated by the cabin control tool running on the vehicle computing system, where a request for the user state information may be requested by the portion of the cabin control tool running on the vehicle computing system to the portion of the cabin control tool running on the wearable device. Based on the receipt of the request, the portion of the cabin control tool running on the wearable device may then transmit the user state information from the wearable device to the vehicle computing system.

Although not specifically illustrated, the bio-physical condition information sensed from the one or more bio-physical sensors on the wearable device may also be transmitted to the vehicle computing system at 24. The bio-physical condition information may be sent according to any one or more of the methods described herein with reference to the transmission of the user state information.

At 25, the portion of the cabin control tool running on the vehicle computing system may optionally obtain sensed information from one or more vehicle sensors that are included in the vehicle system. Such sensors may include ambient temperature sensors, in-cabin temperature sensors, in-cabin heartbeat sensors, in-cabin passenger body temperature sensors, in-cabin passenger breathing sensors, or in-cabin moisture sensors as described with reference to the vehicle computing system 200 illustrated in FIG. 5. So continuing the example with reference to the lookup table 300 in FIG. 3, at 25 an ambient temperature sensor on the vehicle may sense an ambient temperature that may be categorized by the cabin control tool to be a low ambient temperature. Also at 25, an in-cabin temperature sensor may sense an in-cabin temperature that may be categorized by the cabin control tool to be a low cabin temperature.

Then at 26, the cabin control tool may control one or more vehicle systems and/or components based on the user state identified at 23. For example, when the user state is predicted to be in a sweating state based on the analysis of the bio-physical conditions obtained from the wearable device, the cabin control tool running on the vehicle may control the vehicle's HVAC system to cool the vehicle cabin and/or turn down one or more power windows to better cool down the vehicle cabin.

The cabin control tool running on the vehicle may also reference additional vehicle sensor information as described at 25 in order to control one or more vehicle systems and/or components related to the vehicle cabin. For example, in addition to the predicted user's sweating state as described at 23, the cabin control tool may also reference an outdoor ambient temperature as sensed from an ambient temperature sensor on the vehicle in order to identify a low outside ambient temperature (e.g., outside temperature that is below a threshold temperature). In addition, the cabin control tool may reference a cabin temperature from one or more cabin temperature sensors that identifies a low in-cabin temperature. Then based on the user's predicted sweating state, and the obtained outdoor ambient temperature information and the cabin temperature information, the cabin control tool may determine that the conditions are satisfied for turning on the vehicle's window defrost system in addition, or alternatively, to controlling the HVAC system for cooling the vehicle cabin. This is the set up "Entry Conditions" identified in the first (1) line of the lookup table 300 illustrated in FIG. 3.

In the second (2) example identified in lookup table 300, if the cabin control tool identifies a mid activity level (e.g., corresponding to the user engaging in mild exercise such as walking), a mid heart rate, and a low body temperature based on the user condition information sensed from bio-physical sensors on the wearable device, and identifies a low ambient temperature and low cabin temperature from the vehicle sensors, such characteristics may correspond to pre-set entry conditions that cause the cabin control tool to predict the user has engaged in a mild exercise state prior to entering the vehicle and further predict the user may have cold feet state. Then if the cabin control tool identifies the second set of entry conditions are satisfied by the bio-physical condition information obtained from the wearable device at 21 and the sensor information obtained from the vehicle sensors at 25, then at 26 the cabin control tool may determine that the HVAC system should be controlled for turning on the floor fan to address the predicted cold feet of the user. It follows then that the portion of the cabin control tool running on the vehicle computing system controls the HVAC system to run the floor fan for warming up the user's feet.

In the third (3) example identified in lookup table 300, if the cabin control tool identifies a low activity level, a low heart rate, and a low body temperature based on the user condition information sensed from bio-physical sensors on the wearable device, such characteristics may correspond to pre-set conditions that cause the cabin control tool to predict the user is in a tired or sleepy state. Then if the cabin control tool identifies the third set of entry conditions are satisfied by the bio-physical condition information obtained from the wearable device at 21 and the sensor information obtained from the vehicle sensors at 25, then at 26 the cabin control tool determines that the HVAC system for the vehicle should be controlled to allow for outside circulation. It follows then that the portion of the cabin control tool running on the vehicle computing system controls the HVAC system to turn on the air conditioning to high and also open the vents to allow for outside circulation in an attempt to alert the user (i.e., the passenger).

The process described by flowchart 2 is provided for exemplary purposes only, as a process implemented by the cabin control tool for controlling one or more vehicle systems and/or components for creating a vehicle cabin environment based, at least in part, on bio-physical conditions information sensed from one or more bio-physical sensors on a wearable device may include more or less processes.

Also, it should be noted that according to some embodiments the determination of the user state at 23 may be implemented by the cabin control tool running on the vehicle computing system. In such embodiments, the bio-physical condition information obtained at 21 will have been transmitted to the vehicle computing system prior to 23 so that the cabin control tool running on the vehicle computing system may determine the user stated based on received bio-physical condition information. It also follows that for such embodiments, step 24 for transmitting the user state information to the vehicle computing system will not be needed because the user state information is being determined by the vehicle computing system.

Figure 4:
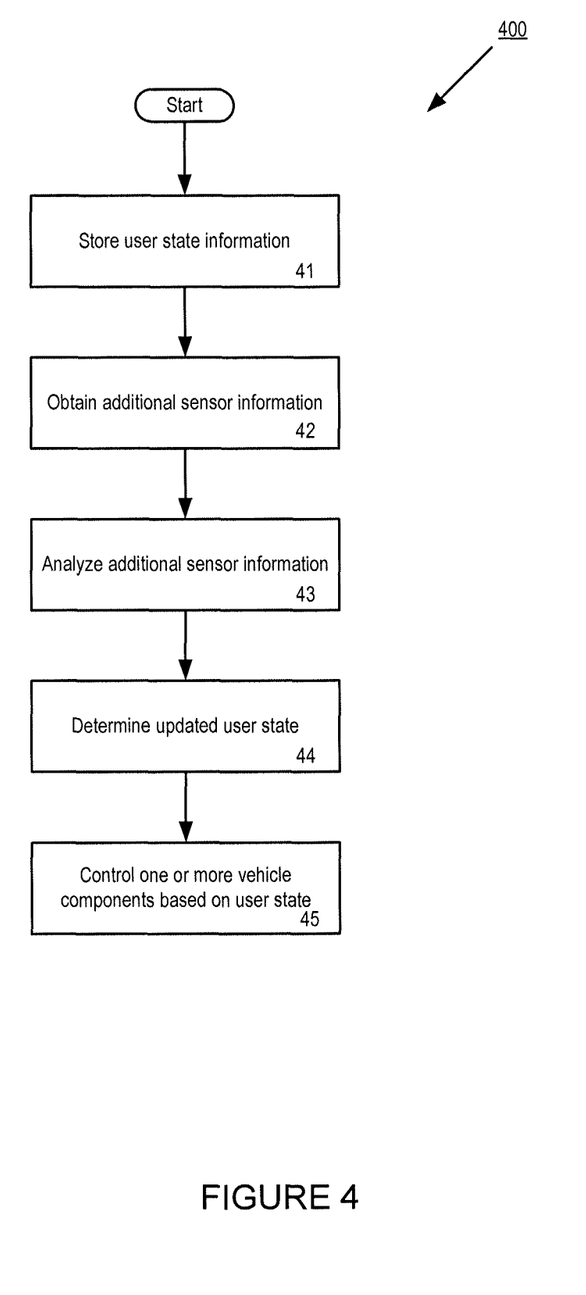
FIG. 4 illustrates an exemplary flow chart describing a process according to some embodiments.

FIG. 4 illustrates a flowchart 400 that describes a process for obtaining bio-physical information from a user, analyzing the sensed bio-physical information in order to determine a state of the user, and controlling one or more vehicle systems or components to create or adjust a vehicle cabin environment based on the determined/predicted state of the user. The process described by flowchart 400 may occur while the user is within a vehicle cabin, and also follow the process described with reference to flowchart 2 illustrated in FIG. 2. The processes described in flowchart 400 may, for example, be controlled by the cabin control tool described herein. Although reference is made to the user of the wearable device, it should be noted that the user described with reference to FIG. 2 corresponds to a passenger of the vehicle that is wearing the wearable device.

At 41, a current state of the user may be stored within a memory unit of a vehicle computing system. The user's current state information may correspond to a state of the user that is identified when the user entered the vehicle cabin, or a state of the user at some time after the user entered the vehicle cabin. The user's current state information may be determined according to any of the methods described herein, with particular reference to the process described by flowchart 2.

At 42, additional sensor information may be obtained according to any one or more of the methods for obtaining sensor information described herein. For example, the additional sensor information may be bio-physical condition information sensed by bio-physical sensors on a wearable device worn by the user while in the vehicle cabin. The bio-physical condition information may be sensed according to any of the methods described herein. In addition or alternatively, the additional sensor information may be vehicle sensor information sensed by vehicle sensors while the user is in the vehicle cabin. The vehicle sensor information may be sensed according to any of the methods described herein.

At 43, the additional sensor information may be analyzed according to any of the methods described herein. For example, the additional sensor information may be bio-physical condition information analyzed in a similar, or same, process as in step 22 in flowchart 2. In addition or alternatively, the additional sensor information may be analyzed according to the process described in step 26 of flowchart 2.

At 44, an updated user state may be determined by the cabin control tool based on the analysis of the additional sensor information. The updated user state may be determined based on the additional sensor information satisfying entry conditions corresponding to a new user state that is different from the user state stored initially at 41.

At 45, the updated user state information may be referenced by the cabin control tool running on the vehicle computing system to control one or more vehicle systems and/or components for adjusting the vehicle cabin environment. For example, a lookup table (e.g., lookup table 300) may be referenced that identifies a specific adjustment to the vehicle cabin environment based on the updated user state determined at 44.

Any process descriptions or blocks in the figures, should be understood as representing modules, segments, or portions of code which include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

What is claimed is:

1. A vehicle computing system comprising:
    a memory that includes cabin settings corresponding to a physical condition of the user; and
    a processor in communication with the memory, configured to:
        analyze biometric data received from a portable device to determine a user activity level before the user entered the vehicle;
        identify the physical condition based on the biometric data and the activity level; and
        adjust the cabin settings based on the identified physical condition.

2. The vehicle computing system of claim 1, wherein the biometric data includes bio-physical condition information sensed from at least one of a moisture sensor, a heartbeat sensor, a breathing sensor, or a body temperature sensor included on a wearable device.

3. The vehicle computing system of claim 1, wherein the physical condition of the user is determined based on the biometric data sensed from one or more bio-physical sensors on a wearable device and the determined activity level satisfying a set of entry conditions that correspond to the identified physical condition.

4. The vehicle computing system of claim 1, wherein the processor is configured to adjust the cabin settings by controlling at least one of a vehicle HVAC system, one or more power windows, interior lighting, or an entertainment system of a vehicle housing the vehicle computing system.

5. The vehicle computing system of claim 1, wherein the processor is configured to adjust the cabin settings based on the physical condition of the user and vehicle sensor information.

6. The vehicle computing system of claim 5, wherein the vehicle sensor information is received from at least one of a heartbeat sensor, or a breathing sensor that are part of a vehicle housing the vehicle computing system.

7. A method for controlling a vehicle cabin environment, comprising:
receiving, by a processor, biometric data from a wearable device;
analyzing, by the processor, the biometric to determine a user activity level before the user entered the vehicle
identifying, by the processor, a physical condition of the user based on current biometric data of the user and the determined activity level; and
controlling, by the processor, cabin settings based on the physical condition of the user.

8. The method of claim 7, wherein the biometric data includes bio-physical condition information sensed from at least one of a moisture sensor, a heartbeat sensor, a breathing sensor, or a body temperature sensor included on the wearable device.

9. The method of claim 7, wherein physical condition of the user is determined based on the biometric data sensed from one or more bio-physical sensors on the wearable device and the determined activity level satisfying a set of entry conditions that correspond to the identified physical condition.

10. The method of claim 7, wherein controlling the cabin settings comprises the processor controlling at least one of a vehicle HVAC system, one or more power windows, interior lighting, or an entertainment system of a vehicle housing the vehicle computing system.

11. The method of claim 7, wherein adjusting the cabin settings is based on the physical condition of the user and vehicle sensor information.

12. The method of claim 11, wherein the vehicle sensor information is received from at least one of a heartbeat sensor, or a breathing sensor that are part of a vehicle housing the vehicle computing system.

13. A vehicle cabin control system, comprising:
a wearable device comprising a plurality of sensors configured to obtain biometric data from a user; and
a vehicle computing system configured to:
receive the biometric data from the wearable device;
analyze the biometric data received from the wearable device to determine a user activity level before the user entered the vehicle;
identify a physical condition of the user based on current biometric data of the user and the determined activity level; and
adjust cabin settings based on the physical condition of the user.

14. The vehicle cabin control system of claim 13, wherein the wearable device includes a processor configured to:
receive an identification signal identifying the vehicle computing system from the vehicle computing system;
recognize the vehicle computing system based on the identification signal; and
in response to recognizing the vehicle computing system, transmit the biometric data to the vehicle computing system.

15. The vehicle cabin control system of claim 13, wherein the wearable device includes a processor configured to:
receive an identification signal identifying the vehicle computing system from the vehicle computing system;
recognize the vehicle computing system based on the identification signal;
determine whether the wearable device is within a predetermined distance from the vehicle computing system, and
transmit the biometric data to the vehicle computing system when the wearable device is within the predetermined distance from the vehicle.

16. The vehicle cabin control system of claim 13 wherein the vehicle computing system is configured to adjust the cabin settings based on the physical condition of the user and vehicle sensor information, the vehicle sensor information received from at least one of a heartbeat sensor, or a breathing sensor that are part of a vehicle housing the vehicle computing system.

* * * * *